Figure 1:
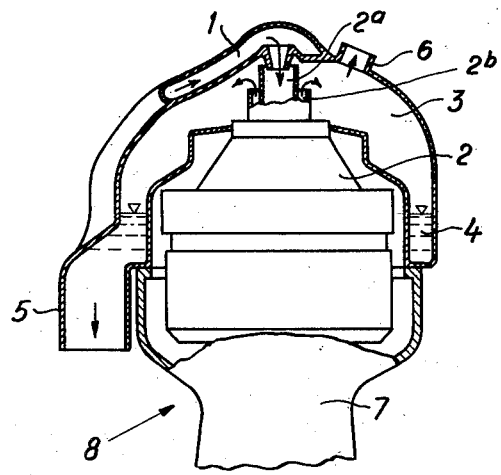

April 30, 1957     S. BESKOW     2,790,598
APPARATUS FOR SEPARATION AND VACUUM-TREATMENT
OF FOAM-PRODUCING LIQUIDS
Filed Dec. 20, 1955

INVENTOR.
Stig Beskow
BY
Davis, Hoxie & Faithfull
ATTORNEYS

United States Patent Office 2,790,598
Patented Apr. 30, 1957

2,790,598

APPARATUS FOR SEPARATION AND VACUUM-TREATMENT OF FOAM-PRODUCING LIQUIDS

Stig Beskow, Bromma, Sweden, assignor to Aktiebolaget Separator, Stockholm, Sweden, a corporation of Sweden Application December 20, 1955, Serial No. 554,315

Claims priority, application Sweden December 23, 1954

6 Claims. (Cl. 233—21)

It is known to separate transformer oil in an apparatus comprising a centrifugal separator in which the receiving chamber for the separated oil is sealed against the outer atmosphere and is in sealed communication with a sealed tank, the upper part of which communicates with a vacuum pump. In prior apparatus of this type, a large pipe line serves as a passage for the separated oil from the receiving chamber to the vacuum tank, and also serves to place this receiving chamber under vacuum via the vacuum tank.

The centrifugal separation of the oil is intended to free it from sludge and free water; and the vacuum-treatment serves to free the oil from gases, especially air, and also from water which is dissolved in the oil or is present in a suspension that is so finely divided that it is not removable by the centrifugal separation. The gases are removed and the water is efficiently evaporated in the evacuated receiving chamber of the centrifugal separator, where the oil, at a temperature above the boiling point of water (at the vacuum present in this chamber), is thrown outward from the centrifugal bowl or rotor in the form of mist consisting of microscopic oil drops, whereby the surface per unit of volume of oil is very large. To ensure quick and complete degasifying and drying of the oil at a temperature which is as low and (from the point of view of oxidation) as harmless as possible, it is thus important to keep the highest possible vacuum in the receiving chamber of the centrifugal separator, and this is the reason why the pipe line from the separator to the vacuum tank has a large diameter and opens into the vacuum tank above the oil level therein.

The gas and steam freed during the vacuum separation produces an oil foam which, to a large degree, fills the pipe line between the receiving chamber of the separator and the vacuum tank and thus makes it impossible to obtain a satisfactory vacuum in the receiving chamber. The degasification and the water evaporation continue to a certain extent in the pipe line and in the vacuum tank as well, and above the oil level in the tank there is formed a foam layer which can impede the evacuation of the pipe line and the centrifugal separator. The difference in height between the opening of the pipe line into the tank and the oil level therein must therefore be great, which means that the volume and the holding time of the oil in the vacuum tank is correspondingly smaller. This relatively great distance in height also means that the separator must be placed in a much higher position in relation to the vacuum tank than if the pipe line could open close above or even below the oil level. Another inconvenience is that the steam evaporated in the separator leaves the latter together with the oil, which entails the risk of condensed water being re-mixed with the oil.

The present invention has for its principal object the provision of an improved apparatus for separation and vacuum-treatment of foam-producing liquids, e. g. oils, and which eliminates the above-mentioned inconveniences. An apparatus made according to the invention comprises a vacuum pipe line directly or indirectly connecting the liquid-free part of the receiving chamber in the separator with the vacuum pump, and a separated liquid line leading from the receiving chamber of the separator to the vacuum tank. The vacuum pump is in communication with the upper part of this tank to maintain a vacuum therein, and the liquid line from the centrifugal separator opens into the tank below the level at which the vacuum pump communicates with the tank, thereby preventing foam entering through the liquid line from being sucked into the vacuum line of the tank.

The vacuum pipe of the receiving chamber of the centrifugal separator can either lead directly to the vacuum pump or be connected to the vacuum line of the tank, or it can open into the upper part of the vacuum tank so that the receiving chamber is placed under vacuum.

The fact that the receiving chamber of the separator is provided with separate lines for liquid discharge and for evacuation, respectively, makes it possible to keep the vacuum line entirely free from foam and liquid, so that the vacuum produced by the vacuum pump can be maintained in full in the receiving chamber.

When the vacuum line of the receiving chamber is connected to the vacuum tank or its vacuum line, care should be taken (for example, in treating a transformer oil to be dried) that any condensate formed in the vacuum line from the receiving chamber is not allowed to enter the vacuum tank, since this would means impairing the degree of dryness already attained in the oil. For this reason, a condensate trap is placed in the vacuum line from the receiving chamber. Alternatively, the vacuum line from the tank may be arranged to open into the vacuum line from the separator through a part which extends downward to the separator vacuum line. If desired, a heat insulation may be arranged around the vacuum line from the receiving chamber of the separator in order to prevent formation of condensate.

Figure 2:
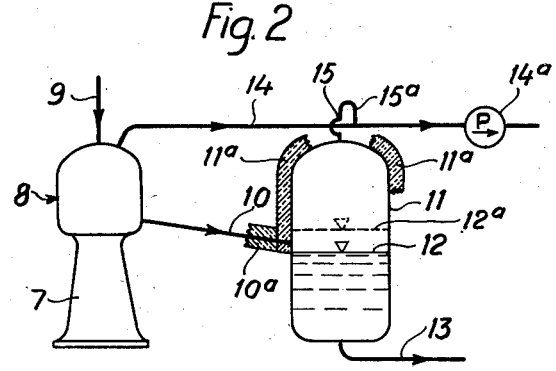

For a better understanding of the invention, reference may be had to the accompanying drawing, in which Fig. 1 is a side elevational view, partly in section, of a centrifugal separator for use in a preferred form of the apparatus, and Fig. 2 is a schematic view of the apparatus. In the following detailed description, it is assumed that transformer oil is to be treated in the apparatus.

In Fig. 1, I have shown a centrifugal separator 8 having an oil inlet 1 leading to the inlet 2a of a centrifugal bowl or rotor 2. In the rotor 2, the sludge and free water are centrifugally separated from the oil and accumulate in the peripheral part of the rotor. The separated oil is discharged through the rotor outlet 2b, from which it is thrown outward and caught in a receiving chamber 3, in the lower part of which the oil 4 is collected. This oil escapes through an outlet 5 (which in Fig. 1 partly obscures the inlet pipe 1). In the upper or liquid-free part of the receiving chamber 3 is a connection 6 for a vacuum line 14 (Fig. 2). All lines to and from the separator are hermetically sealed, and the whole separator frame 7 is also hermetically sealed, whereby the receiving chamber 3 is entirely sealed against the outer atmosphere.

In Fig. 2, an oil supply line 9 leads to the oil inlet 1 of separator 8, and the separated oil is led away from the outlet 5 through a liquid pipe line 10. The latter opens into a vacuum tank 11 either above or below the liquid level 12, which is maintained by conventional means (not shown) controlling the pumping of oil from tank 11 through the discharge line 13. From the separator, a vacuum pipe line 14 leads to a vacuum pump 14a. The tank 11 is connected at its upper part (above the opening of pipe 10 into the tank) to the line 14 by means of a line 15. The communication line 15 is provided with a part 15a leading downward into the vacuum line 14 and thus serving as a means for preventing condensate from entering the tank from the vacuum line 14.

If the oil contains much gas and/or moisture and thus foams intensely during the vacuum treatment, it is advisable to locate the oil level 12 below the opening of the line 10 into the vacuum tank 11, so that the oil is allowed to foam freely and thereby to give off the gas and steam desired to be removed. In other cases, it may be preferable to locate the oil level above the opening of the line 10, as shown at 12a, in order to give the oil the longest possible holding time and to allow it to dry as efficiently as possible in the tank.

I prefer to arrange a heat insulation on the oil line 10, as shown in part at 10a, in order to prevent the water, evaporated during the passage of the oil through the line, from being condensed on the wall of the line 10 and from passing down into the vacuum tank and impairing the drying result already attained. For the same reason, I also prefer to heat-insulate the vacuum tank 11 as shown in part at 11a, particularly that portion which normally is above the oil level 12.

I claim:

1. Apparatus for separation and vacuum treatment of a foam-producing liquid, such as an oil, which comprises a centrifugal separator having a centrifugal bowl provided with an inlet for said liquid and with an outlet for the centrifugally separated liquid, the separator also having a receiving chamber for the separated liquid from said outlet, said chamber having a liquid-free part and being sealed against the outer atmosphere, a vacuum tank, a vacuum pump in communication with the upper part of said tank to maintain a vacuum therein, a vacuum pipe line connecting said liquid-free part of the chamber with the vacuum pump, and a liquid pipe line for the separated liquid leading from the receiving chamber to the vacuum tank, said liquid pipe line opening into the tank below the level at which the vacuum pump is in communication with the tank.

2. Apparatus according to claim 1, in which said tank has a predetermined liquid level, said liquid pipe line opening into the tank above said liquid level.

3. Apparatus according to claim 1, in which said tank has a predetermined liquid level, said liquid pipe line opening into the tank below said liquid level.

4. Apparatus according to claim 1, in which said communication between the tank and the vacuum pump is by way of said vacuum pipe line, the apparatus comprising also means for preventing condensate from entering the tank from said vacuum pipe line.

5. Apparatus according to claim 1, comprising also heat insulation on said liquid pipe line.

6. Apparatus according to claim 1, comprising also heat insulation on said vacuum tank.

References Cited in the file of this patent
UNITED STATES PATENTS 1,529,884    Hall  ------------------- Mar. 17, 1925